United States Patent [19]

Stein et al.

[11] Patent Number: 5,459,306

[45] Date of Patent: Oct. 17, 1995

[54] METHOD AND SYSTEM FOR DELIVERING ON DEMAND, INDIVIDUALLY TARGETED PROMOTIONS

[75] Inventors: Buddy Stein, Fort Lauderdale; Lee V. Twyford, Plantation; David D. Minter; Michael M. Wilson, both of Fort Lauderdale, all of Fla.

[73] Assignee: Blockbuster Entertainment Corporation, Fort Lauderdale, Fla.

[21] Appl. No.: 261,909

[22] Filed: Jun. 15, 1994

[51] Int. Cl.$^6$ ............................................. G06K 15/00
[52] U.S. Cl. .................... 235/383; 235/381; 235/375
[58] Field of Search ................................. 235/375, 381, 235/383

[56] References Cited

U.S. PATENT DOCUMENTS

| | | | |
|---|---|---|---|
| 4,554,446 | 11/1985 | Murphy et al. | 235/487 |
| 4,703,423 | 10/1987 | Bado | 364/400 |
| 4,723,212 | 2/1988 | Mindrum | 364/401 |
| 4,825,045 | 4/1989 | Humble | 235/383 |
| 4,833,308 | 5/1989 | Humble | 235/383 |
| 4,896,791 | 1/1990 | Smith | 221/7 |
| 4,908,761 | 3/1990 | Tai | 364/401 |
| 4,910,672 | 3/1990 | Off | 364/405 |
| 5,056,019 | 10/1991 | Schultz | 364/405 |
| 5,095,195 | 3/1992 | Harman | 235/381 |
| 5,173,851 | 12/1992 | Off | 364/401 |
| 5,237,157 | 8/1993 | Kaplan | 235/375 |
| 5,305,196 | 4/1994 | Deaton | 364/401 |
| 5,319,455 | 6/1994 | Hoarty | 348/7 |
| 5,327,508 | 7/1994 | Deaton | 382/7 |

FOREIGN PATENT DOCUMENTS 1-321560  12/1989  Japan ........................... G06F 15/21

OTHER PUBLICATIONS

Article entitled "Checking Out the Customer" by Lena H. Sun, *The Washington Post* Business Section, dated Jul. 9, 1989.

Article entitled "Ukrop's Tests Data Base Marketing Program" by Holly Klokis, *Chain Store Age Executive*, Sep. 1967.

"Coupon Clippers, Save Your Scissors", Information Processing, Jun. 20, 1994, pp. 164 and 166.

Primary Examiner—Harold Pitts
Attorney, Agent, or Firm—Foley & Lardner

[57] ABSTRACT

A method and system for delivering product picks to a prospective individual user. Personal user information is gathered. Information on a user's use of a product during product use is gathered, correlated and stored. A user code provided to the user is correlated with the user information and the use information. The user information and the use information is classified based on use of the product. Classes of information potentially relevant to future purchases are identified. Product picks (promotions and recommendations) are delivered based on the classified information and the user information, responsive to an inquiry on behalf of the user.

24 Claims, 3 Drawing Sheets

FIG. 4

Last chance to buy Aladdin!
01234567891

The Discovery Zone
01234567891

Last chance to buy Aladdin!
01234567891

33

MAR  14  1994

① NATL LAMPOON'S XMAS VACATION  1989    R
② ROMANCING THE STONE  1989    R
③ ROBIN HOOD: MEN IN TIGHTS  1993    PG
④ GOOD FELLAS  1972    R
⑤ THE GAUNTLET  1980    PG
⑥ THE PACKAGE  1982    PG13
⑦ CHINATOWN  1975    R
⑧ SONG OF THE SOUTH  1965    G
⑨ ALADDIN  1993    G
⑩ HOWIE MANDEL LIVE, CAROLINE'S  1987    R

31

BLOCKBUSTER
TAKE 10
PERSONAL VIDEO PICKS

METHOD AND SYSTEM FOR DELIVERING ON DEMAND, INDIVIDUALLY TARGETED PROMOTIONS

BACKGROUND OF THE INVENTION

1. Field of the Invention

The invention relates to real-time production of coupons, and, more particularly, to a method and system for delivering on demand, individually targeted promotions and recommendations coupons.

Business have become aware that they can promote more sales by furnishing prospective customers with coupons for their products. Thus, for example, mass mailings of coupons or other promotional materials can be used by producers or retailers to encourage prospective consumers to purchase the product.

It is also be possible to promote more sales once the customer has arrived at the store location. Various traditional methods of promoting products at the store are well known.

Nevertheless, the fact that a customer is at the store location is not a guarantee that anything will be purchased or rented. This problem is especially acute for the entertainment rental industry, particularly on heavy weekends and for new releases. A study of the movie rental and sale business shows that a high percentage of customers walk out without renting or purchasing a product. The reason is that customers arrive with a preconceived choice of product. If that product is not available, the majority of these customers look for a second choice, but still leave without making a selection.

2. Description of the Related Art

Mass mailings of coupons and promotional materials can be slightly more targeted through the use of mailing lists. Such mass mailings are based on pre-purchased mailing lists which are customarily developed by outside firms. Thus, a company will be limited in certain respects in determining the criteria for inclusion in the mailing list.

Another of the problems in providing coupons is predicting which coupons will be used by which customers. It is a waste of time and money to provide coupons to customers who are not interested in the products.

There is always the possibility that a promotional offering will receive a response greater than the available supply. Such an outcome may be perceived negatively by a disappointed consumer.

More recently, prospective consumers have been targeted at the check-out stand. That is, if a consumer purchases, for example, baby food, the computer will assume that consumer is interested in baby items and will produce a coupon for a particular brand of instant formula.

These types of systems do not take into consideration whether the consumer previously purchased that item. Indeed, since the targeted items are consumable products, there is less need to discriminate between items which may or may not have been previously purchased.

Another problem with these types of systems is that they do not develop a consumption history related to the consumer. Therefore, the type of coupon produced by the system is based solely on the item currently purchased.

One disadvantage of the system is that it does not include a mechanism to explicitly target the particular consumer. If the consumer makes a single item purchase, it may be extremely difficult for the system to determine an appropriate coupon based on the sample of the single item. This would be true even if the consumer had previously purchased hundreds or even thousands of items at the store, as would be the case at a supermarket. Therefore, the fact that the system produces a coupon for an item hardly suggests that the item is recommended for that particular purchaser.

Conventional methods are available which provide the ability to collect information concerning product selections and correlated the information to the individual consumer. For example, U.S. Pat. No. 5,237,157, to Kaplan, provides for a method for gathering information concerning an individual's selections at a product preview kiosk. Unfortunately, there are no systems which use this information for the production of promotional coupons.

Thus, there remains a need for a system which can provide individually targeted promotions and recommendations coupons. There is also a need for a system which can more accurately predict a likely purchase for the consumer. Another persisting need is for a system which will not promote items which are out of stock. Yet another need is for a system with complete flexibility in determining when to produce a coupon.

SUMMARY OF THE INVENTION

It is therefore one object of the invention to deliver real-time product "picks", including recommendations and/or promotions, to a user.

It is one other object of the system to give personal attention to the user.

It is another object of the system to better avoid promoting a product which is not currently available.

It is another object of the invention to provide these picks at the check-out stand or at a kiosk, where selections are made.

It is yet a further object of the invention to take into consideration whether the consumer previously purchased that item.

It is a feature of the invention to develop a consumption history related to the consumer.

It is another feature of the invention that the picks are provided based on items previous purchased or rented.

One advantage of the invention is that the system communicates individually with the user each time the user makes a purchase or rental.

A further advantage of the system is that it explicitly targets the particular consumer.

It is another object of the system to more accurately predict an appropriate purchase for the individual consumer.

It is another object of the system to be adaptable to the broader entertainment industry, especially for movie, music, and game rentals, purchases and on-location use.

Other objects and advantages of the invention will become more apparent hereinafter in reference to the detailed description of the preferred embodiments and drawings.

In accordance with one aspect of the invention, a method for delivering product picks to a prospective individual user for a product line available for sale or use by the prospective user includes gathering personal user information, and gathering use information on a user's use of at least one product during routine product use. The user information and the use information are stored in data processing retrievable form. A user code is provided to the prospective user. The user code is entered into a data processing means. The user code is correlated with the user information and the use information. The user information and the use information is classified based on use of the at least one product, into classified information. At least one class of information is identified as potentially relevant to future purchases. Product picks are identified and delivered based on the classified information and the user information, responsive to an inquiry on behalf of the user.

In accordance with another aspect of the invention, there is provided a system for delivering product picks to a prospective individual user for a product line available for use by the prospective user. It includes a first data processor operable to gather personal user information, and to gather use information on a user's use of at least one product during routine product use. The data processor includes storage for storing the user information and the use information in data processing retrievable form. The system also includes user code associated with the prospective user. There is provided a means for entering the user code, responsive to an inquiry on behalf of the user. Also provided is a first data processing means for receiving the user code and correlating the user code with the user information and the use information. Additionally, there is stored classified information derived from the user information and the use information based on use of the at least one product. Also provided is a second data processing means for identifying product picks based on the classified information and the user information, responsive to the inquiry on behalf of the user. There is at least one output device for outputting identified product picks.

BRIEF DESCRIPTION OF THE DRAWINGS

An exemplary embodiment of the invention is illustrated in the drawings and described in detail below.

In the drawings:

FIG. 4 is an example of a promotion and product coupon ticket provided by the system.

DETAILED DESCRIPTION OF THE PREFERRED EMBODIMENTS

Figure 1:
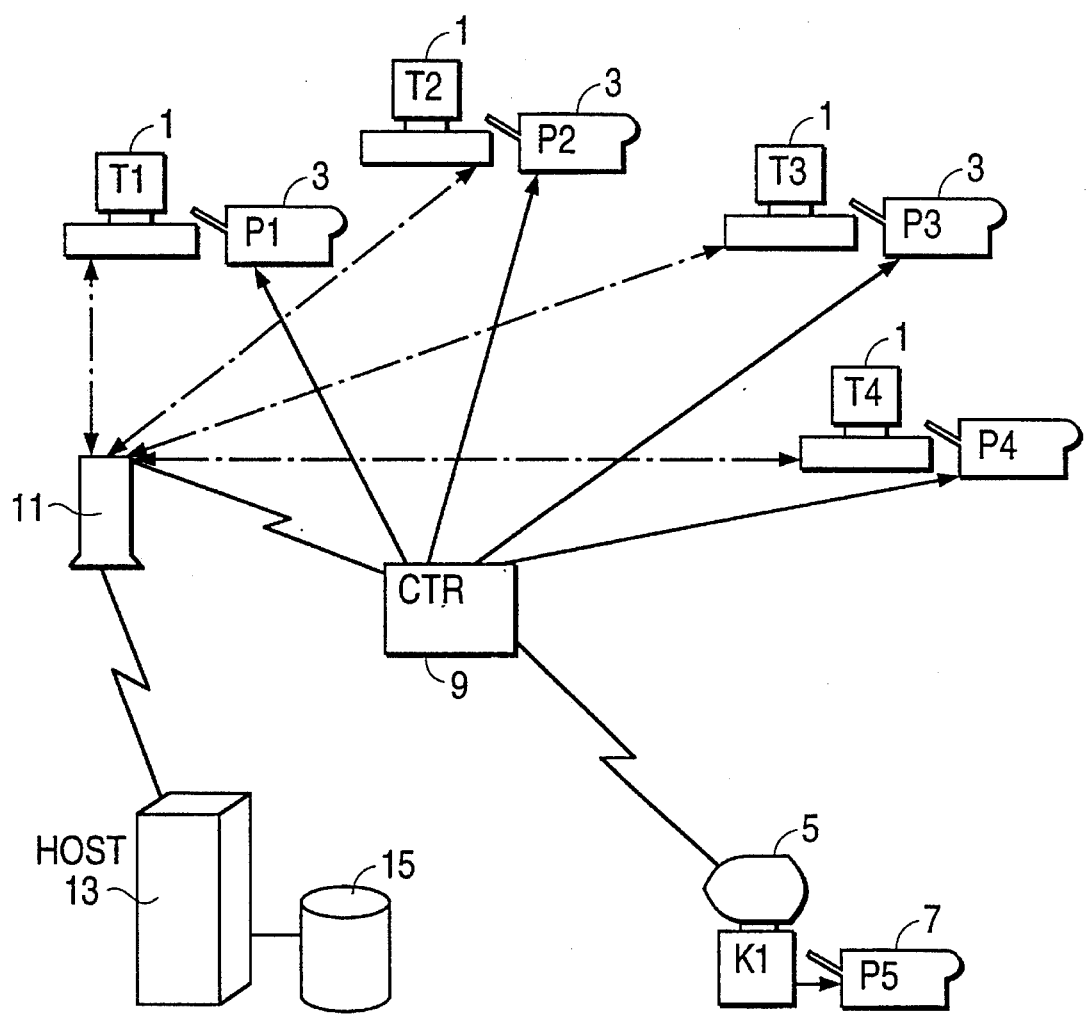
FIG. 1 is a diagram of a full system for delivering on demand, individually targeted promotions and product coupons.

FIG. 1 illustrates the general structure of one embodiment of a system for delivering product picks to prospective consumers. The term "picks" as used herein refers to either product recommendations, or product promotions, or both. Also, the term consumer is used both for the sense of purchasing or renting items, or using items in-store. Likewise, the term "use" with respect to a product includes rental, purchase and in-store use of a product.

The illustrated system includes four customer checkout terminals T1–T4 1, and a coupon printer P1–P4 3 located at each customer checkout terminal 1. The illustrated system also includes an in-store kiosk K1 5, with a coupon printer P5 7 attached to the kiosk 5.

A coupon controller 9 is connected directly or indirectly to each coupon printer P1–P4, P5, for directing the printing of coupons. A point-of-sale computer 11 is connected to the coupon controller 9 and each customer checkout terminal 1, and a host system 13.

The host system 13 includes host storage 15. The host system 13 is preferably a central host mainframe. The host storage 15 is utilized to store the following information:

updates or changes for the point-of-sale computer 11 specific promotional items graphics associated with a particular item text associated with a particular item products which should be available customer specific information rules for predicting purchases The host storage 15 on the host system 13 can be used to provide a national data base of customers. Customer specific information stored in the data base includes, for example, the customer's birthday, their address, whether there are children, and past products rented (by title, genre, category, etc.).

The rules for predicting purchases that are used by the system are pre-determined based on the goal of increasing sales and rentals. The precise rules are not critical to the system, since the rules are continually refined or updated. Nevertheless, the rules would utilize the information collected by the system to predict purchases.

The following are exemplary rules which could be applied in a movie rental/purchase scenario:

select movies that an individual or household has not yet rented or purchased.

select movies which are in a "best" list, for example, the top 1,000 or 2,000.

select movies which have been rented the most frequently by other customers.

select movies based on the genre of a movie rented, star(s) in the movie rented, past rental history (for example, children's movies), and other factors As examples of applying the last rule, for a household which has a pattern of renting children's/Disney movies, top children's titles are selected. If an individual rents Bram Stokers "Dracula" the system would select five to ten top horror movies.

The rules preferably incorporate the following parameters. The selected titles should be randomized so that selections are not repeated. Randomization could be accomplished by either having the host system send a randomized list each day, or by having the in-store controller select random entries from a list.

Another parameter which the rules should incorporate is that the system should not select a purchase or rental which has already been purchased or rented by that household or individual.

Yet another parameter which the rules could incorporate is that movies could be selected from multiple genres, if the customer has a history of selecting from those genres.

Yet another rule could limit the list of recommendations to, for example, ten products. Another preferable rule is that the system would not select titles which are not in stock at the location.

Promotions could include discount coupons and announcements. For example, the promotions could be seasonal text promoting gift suggestions. The promotions could announce new games or releases, could be reminders of birthdays, and could announce third-party offers or promotions.

The host system 13 can be any commercially available mainframe. The host system 13 communicates with the point-of-sale computer 11 on an infrequent, but regular, basis. It is advantageous for the host system 13 to dial up the point-of-sale computer 11 once per day and poll the point-of-sale computer 11 for current information on inventory and new information collected on customers.

At the same time, the host system 13 preferably informs the point-of-sale computer 11 of updates and changes to code and data, promotions, graphics, rules, products, and customers. Since traditionally each store has its own point-of-sale computer 11, the host computer 13 performs this dial-up and polling for each of a virtually unlimited number of point-of-sale computers 11.

This existing point-of-sale computer 11 can be utilized as a part of this invention. That is, it is advantageous to use the point-of-sale computer, which probably exists in existing stores, to monitor real-time transactions. The point-of-sale computer 11 can collect the real-time transaction information from the customer checkout terminals 1. When a customer purchases a particular product, the point-of-sale computer 11 will note the customer and the product. Also, the point-of-sale computer 11 can track in-store inventory based on purchases and returns, in an inventory data base. Further, the point-of-sale computer 11 preferably stores information concerning all transactions and transmits the stored information to the host system 13 when polled. As discussed above, the polling is preferably on a daily basis.

The point-of-sale computer 11 is the point of contact with the host system 13, and therefore receives the updates, changes, promotions, graphics, rules, product information and customers from the host system 13, and transmits the real-time transaction information to the host system 13 when polled. The point-of-sale computer 11 can be implemented as a micro-vax.

Figure 2:
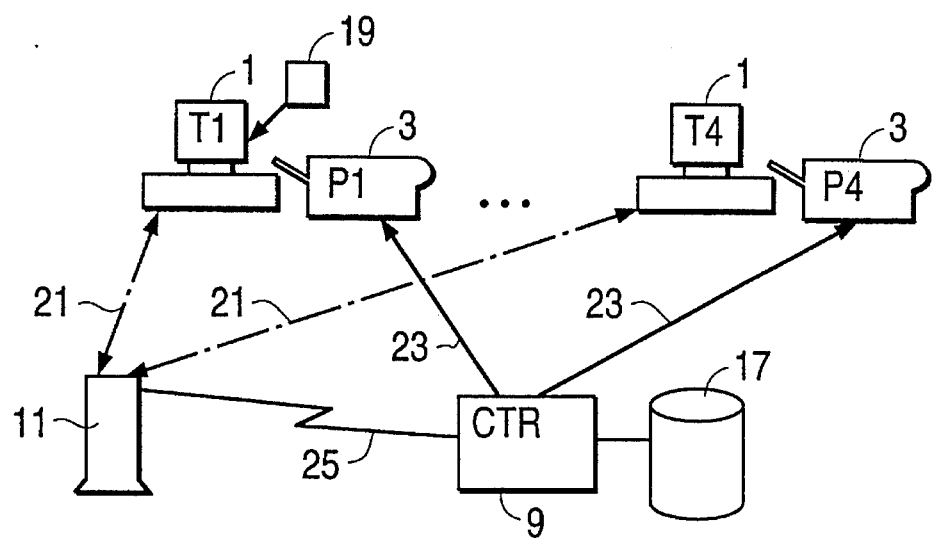
FIG. 2 is a diagram of a customer checkout terminal subsystem of the system.
Figure 3:
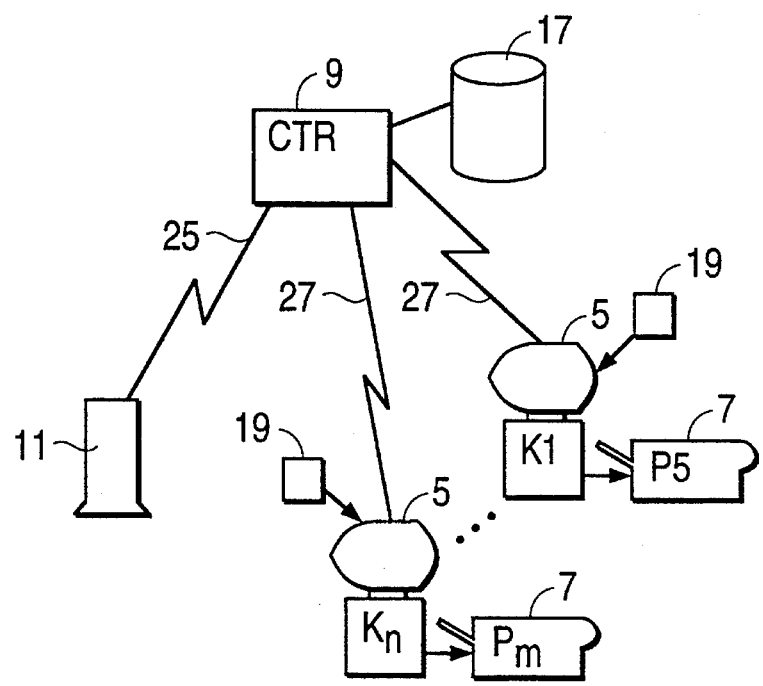
FIG. 3 is a diagram of a kiosk subsystem of the system.

The system can be conceptualized as including a combined customer check-out terminal subsystem, illustrated in FIG. 2, and a kiosk subsystem, illustrated in FIG. 3. The system as it is implemented in a particular store may omit components and steps specific to one of the subsystems.

Reference is made to FIG. 2, showing a customer check-out terminal subsystem. There are a number of customer check-out terminals 1. The actual number of check-out terminals 1 is determined by the requirements of the location where the system will be used. Thus, there may be one to four or even more check-out terminals 1. In the illustrated embodiment, a coupon printer 3 is located physically adjacent to each check-out terminal 1. However, the coupon printer 3 and the check-out terminal 1 are not directly connected to each other. The coupon printer 3 will be able to print recommendations and promotions coupons in real-time at high speed.

As illustrated, the point-of-sale computer 11 communicates via communication line 21 with each check-out terminal 1. The line 21 can be a standard parallel communication line, or any other conventional communication line. On the other hand, each coupon printer 3 and the point-of-sale computer 11 communicates with the coupon controller 9 via communications lines 23, which is also a standard parallel communications line.

The coupon controller 9 maintains a customer history file based on real-time transactions monitored by the point-of-sale computer 11. Thus, a coupon controller 9 in a particular store need only store information for that store location, and for individuals which use that store location.

The coupon controller 9 communicates with the point-of-sale computer 11 via line 25. The communications line 25 may be any conventional communications line, for example, RS-232. The coupon controller 9 receives the updates, changes, promotions, graphics, rules from the host system 13 passed through via the point-of-sale computer 11.

Using the information thus provided and the stored customer history information for a particular customer, the coupon controller 9 identifies product recommendations and promotions, and creates the graphics commands via communications line 23 to cause each printer 3 to print the coupon.

The check-out terminal 1 will begin the process when a user code is entered. The user code is preferably uniquely correlated to an individual. When establishing the user code, other relevant information can be gathered and entered into the system, such as name, address, family members, demographic information, or any other information desired as a variable in the system. As illustrated, the user code can be entered via a scanable card 19. Alternatively, the user code can be entered manually, for example, through a keyboard. The entry of the user code will permit the coupon controller 9 to correlate the user code to the stored user information, and thus to base selections on the individual user. If the user code is not recognized by the system (for example, a new user or a user from a different store location), a default selection can be used.

As a part of the process, the system gathers information about the user's product use associated with the user code. This information is stored as part of the customer history file in storage 17 at the store location.

Reference is made to FIG. 3, showing a kiosk subsystem. There are a number of kiosks 5. The actual number of kiosks 5 is determined by the requirements of the location where the system will be used. Thus, there may be optionally one or more kiosks 5. In the illustrated embodiment, a coupon printer 7 is located physically adjacent to each kiosk 5, and communicates directly with the kiosk 5. The coupon printer 7 will be able to print recommendations and promotions coupons in real-time at high speed.

As illustrated, the point-of-sale computer 11 communicates via communication line 27 with each kiosk 5. The communication line 27 can be a standard communications network, such as Ethernet. The coupon controller 9 identifies product recommendations and promotions, and creates and transmits the graphics commands via communications line 27 to cause each printer 7 to print the coupon. The graphics commands to the printer 7 are passed through the kiosk 5 to the printer.

The kiosk 5 will begin the process when the user code is entered. As with the check-out terminals, the user code can be entered via the scanable card 19, or entered manually. The entry of the user code will permit the coupon controller 9 to correlate the user code to the stored user information, and thus to base selections on the individual user. If the user code is not recognized by the system (for example, a new user or a user from a different store location), a default selection can be used.

The coupon is preferably printed when the user completes a transaction at either the check-out terminal 1 or the kiosk 5. However, the coupon could be printed at any point in the transaction.

To prevent a user from monopolizing a kiosk 5, the coupon controller 9 may suppress the transmission to the printer 7 until after a certain time delay, or after a predetermined number of transactions. Also, the coupon controller 9 may suppress the transmission to the printer 3 until after a time delay to prevent the user from obtaining a second coupon during one visit to a store location.

FIG. 4 illustrates an example of a coupon printed out by the system. As shown, ten movies have been selected by the system as recommendations, and are listed in a numeric printout 31. The recommendations include titles, year, actors, a brief text description, and a rating. The coupon identifies the recommendations as being specific to the user. Also, three promotions are listed 33. The promotions include graphics, text, and a scan code. The number of recommendations and promotions that is listed in the coupon can be varied as desired.

The system is utilized as in the following example. Assume that a store in which the coupon controller 9, point-of-sale computer 11, check-out terminal 1, printer 3, kiosk 5 and printer 7 has opened for the day.

A database is provided on the host storage 15 with files having records for products, such as films, compact discs, games, and other entertainment products. These files classify the products according to genre, and are searchable by title, genre, and category. Another data base on the host storage 15 stores promotions, including text. The promotions are also classified according to type. Yet another data base on the host storage 15 stores graphics to be correlated to promotions and/or product recommendations. Another data base on the host storage 15 has records for every customer, and includes all information collected for that customer, including past product selections. Also stored on the host are files with pre-determined rules. These files for rules could be executable code implementing the rules, if desired. The host computer 13 does not yet communicate with the point-of-sale computer 11.

A customer has requested a card, and the system inputs information required to build a record for that individual customer, via interaction with the customer. The information input is indicated above. A card 19 is generated, with a unique user code.

At the store, the user browses the available products and selects a product, for example a movie for rental. At the check-out terminal 1, the user is identified to the system by the user code on the card 19. The product is identified to the point-of-sale computer 11 by a product code unique to that product. The product has already been classified by the system according to genre, or other information which is determined to be relevant to future purchases. The point-of-sale computer 9 communicates with the coupon controller 11, and informs the coupon controller 9 of the user's selection of that product. The user's selection of that product is stored as customer information in the coupon controller storage 17 customer history file for that user. This can be repeated for multiple products.

The coupon controller 9 accesses a rule, and uses the customer information to determine a classification of products which should be recommended to the user. Based on the classification of products, the rule and the customer information, the coupon controller 9 determines a pre-determined number of products which are to be recommended. The coupon controller 9 also determines which promotions are to be provided, based on the classification of products, current promotions, and the customer information.

The graphics and text for recommendations for those products and, promotions are retrieved from storage 17 and transmitted to the check-out terminal printer 3 associated with that check-out terminal 1. The check-out terminal printer 3 then prints out the coupon with those graphics and text by the time the user has terminated a session at the check-out terminal.

Alternatively, the user interacts with the kiosk 5, entering the user code via scanning of the card 19 or keyboard entry. The system correlates the user code with the information about the user which is stored in the coupon controller storage 17. A kiosk can be used for its conventional function of previewing products. While at the kiosk, the user requests recommendations of products. Available products have already been classified by the system according to genre, or other information which is determined to be relevant to future purchases.

The kiosk 5 communicates with the coupon controller 9, and informs the coupon controller 9 of the user's request for recommendations. The user's previous selection of products is stored as customer information in the coupon controller storage 17 customer history file for that user.

The coupon controller 9 accesses a rule, and uses the customer information to determine a classification of products which should be recommended to the user. Based on the classification of products, the rule and the customer information, the coupon controller 9 determines a pre-determined number of products which are to be recommended. The coupon controller 9 also determines which promotions are to be provided, based on the classification of products, current promotions, and the customer information.

The graphics and text for recommendations for those products and promotions are retrieved from storage 17 and transmitted to the kiosk 5. The kiosk 5 then causes the kiosk printer 7 to print out the coupon with those graphics and text by the time the user has terminated a session at the kiosk 5.

Different users would use the kiosk and/or terminal in any given day. For video stores, it would be unusual for an individual user to use the system more than once a day. Therefore, it is optimal for the host computer 13 to poll the in-store computer once a day for new information.

Thus, the point-of-sale computer 11 receives a dial-in from the host computer 13. During the dial-in session, the host computer 13 will transmit any new updates, changes, promotions, graphics, rules, and products. The advantage of this is that the centralized host computer 13 can control any promotion or recommendation. Since the host computer 13 polls once a day, the control can be provided within one day's notice.

During the dial-in session, the point-of-sale computer 11 will transmit to the host computer new information in the customer history file. For example, the information transmitted by the point-of-sale computer includes data on new customers and customers "foreign" to the store, and user codes and part numbers associated with each user's selections, since last polled by the host computer. (A "foreign" customer is one known to the system, but not known at the location of the point-of-sale computer.)

The point-of-sale computer 11 will also request customer histories from the host computer 13 for any "foreign" customers which are unknown where the point-of-sale computer 11 is located. When the point-of-sale computer 11 makes such a request, the host computer 13 transmits the customer history information for each "foreign" customer to the point-of-sale computer, and the point-of-sale computer 11 stores the information as part of its customer history file.

Output devices have been illustrated and discussed as the printer at the kiosk subsystem, and the printer in the customer terminal subsystem. Alternatively, the output device could be any other hard or soft copy device such as a printer or computer screen usable by the user.

The system as described and illustrated can also be adapted for other industries which print tickets or coupons, such as the sports industry, concert halls and pavilions, movie theaters, and ticket/reservation services such as TICKETRON.

While specific embodiments of the invention have been described and illustrated, it will be clear that variations in the details of the embodiments specifically illustrated and described may be made without departing from the true spirit and scope of the invention as defined in the appended claims and equivalents thereof.

What is claimed is:

1. A method for delivering product picks to a prospective individual user for a product line available for use by the prospective user, comprising the steps of:
    (a) gathering personal user information, and gathering use information on a user's use of at least one product during routine product use, and storing the user information and the use information in data processing retrievable form;
    (b) providing a user code to the prospective user;
    (c) entering the user code into a data processing means;
    (d) correlating the user code with the user information and the use information;
    (e) classifying the user information and the use information based on use of the at least one product, into classified information;
    (f) identifying at least one class of information potentially relevant to future purchases; and
    (g) identifying and delivering product picks based on the classified information and the user information, responsive to an inquiry on behalf of the user.

2. The method as claimed in claim 1, wherein the user information is stored on a central host system.

3. The method as claimed in claim 2, wherein the use information is gathered by a point-of-sale computer.

4. The method as claimed in claim 3, further comprising the step of periodically communicating between the point-of-sale computer and the host computer, to transmit use information since a last transmission.

5. The method as claimed in claim 3, further comprising the step of periodically communicating between the point-of-sale computer and the host computer, to provide any new updates, changes, promotions, graphics, text, rules and customer information.

6. The method as claimed in claim 1, the user code and use information being entered via a customer check-out terminal communicating with a point-of-sale computer, the point-of-sale computer communicating with a coupon controller to initiate step (g), and the product picks being delivered from the coupon controller to an associated output device.

7. The method as claimed in claim 6, comprising a plurality of customer check-out terminals and associated output devices.

8. The method as claimed in claim 1, the user code and use information being entered via a kiosk communicating with a coupon controller, and the product picks being delivered from the coupon controller to the kiosk, and the product picks being printed from an associated output device communicating with the kiosk.

9. The method as claimed in claim 8, comprising a plurality of kiosks and associated output devices.

10. The method as claimed in claim 8, wherein the coupon controller transmits the user code and use information to the data processing means.

11. The method as claimed in claim 1, wherein the user information comprises the user code and a part number associated with the product used by the user.

12. The method as claimed in claim 1, the classifying step including classifying based on product lines.

13. A system for delivering product picks to a prospective individual user for a product line available for use by the prospective user, comprising:
    (a) a first data processor operable to gather personal user information, and to gather use information on a user's use of at least one product during routine product use, the data processor including storage for storing the user information and the use information in data processing retrievable form;
    (b) a user code associated with the prospective user;
    (c) means for entering the user code, responsive to an inquiry on behalf of the user;
    (d) a first data processing means for receiving the user code and correlating the user code with the user information and the use information;
    (e) stored classified information derived from the user information and the use information based on use of the at least one product;
    (f) a second data processing means for identifying product picks based on the classified information and the user information, responsive to the inquiry on behalf of the user; and
    (g) at least one output device for outputting identified product picks.

14. The system as claimed in claim 13, the first data processor being a central host system.

15. The system as claimed in claim 14, the first data processing means being a point-of-sale computer.

16. The system as claimed in claim 15, the point-of-sale computer transmitting use information since a last transmission to the host computer.

17. The system as claimed in claim 15, the host computer communicating new updates, changes, promotions, graphics, text, rules and customer information to the point-of-sale computer.

18. The system as claimed in claim 13, the first data processing means being a point-of-sale computer, the means for entering a user code being a customer check-out terminal communicating with the point-of-sale computer, the second data processing means being a coupon controller communicating with the customer check-out terminal, and the output device communicating with the coupon controller to deliver product picks.

19. The system as claimed in claim 18, comprising a plurality of customer check-out terminals and associated output devices.

20. The system as claimed in claim 13, the first data processing means being a point-of-sale computer, the means for entering a user code being a kiosk communicating with the point-of-sale computer, the second data processing means being a coupon controller communicating with the kiosk, and the output device communicating with the kiosk to deliver product picks.

21. The system as claimed in claim 20, comprising a plurality of kiosks and associated output devices.

22. The system as claimed in claim 20, wherein the coupon controller transmits the user code and use information to the point-of-sale computer.

23. The system as claimed in claim 13, wherein the user information comprises the user code and a part number associated with the product used by the user.

24. The system as claimed in claim 13, the classified information being further derived from product lines.

* * * * *